United States Patent [19]

Weil et al.

[11] Patent Number: 4,546,143

[45] Date of Patent: Oct. 8, 1985

[54] RUBBER VULCANISATES, HAVING A SHORE A HARDNESS OF BELOW 65°

[75] Inventors: Joachim Weil; Richard Sattelmeyer, both of Wiesbaden, Fed. Rep. of Germany

[73] Assignee: Hoechst Aktiengesellschaft, Fed. Rep. of Germany

[21] Appl. No.: 480,093

[22] Filed: Mar. 29, 1983

[30] Foreign Application Priority Data

Mar. 31, 1982 [DE] Fed. Rep. of Germany ....... 3211917

[51] Int. Cl.$^4$ ...................... C08L 21/00; C08L 61/06; C08K 3/04; C08K 5/01
[52] U.S. Cl. .................................................. 524/511
[58] Field of Search ............................... 524/511, 138

[56] References Cited

U.S. PATENT DOCUMENTS

| | | | |
|---|---|---|---|
| 2,702,287 | 2/1955 | Iknayan et al. | 524/511 |
| 2,726,224 | 12/1955 | Peterson et al. | 524/511 |
| 2,794,009 | 5/1957 | Gunberg | 524/511 |
| 3,631,143 | 12/1971 | Rizzer | 524/511 |
| 4,014,827 | 3/1977 | Hart | 524/511 |
| 4,200,556 | 4/1980 | Robinson | 525/138 |
| 4,383,005 | 5/1983 | Weil et al. | 524/511 |
| 4,383,072 | 5/1983 | Thiel et al. | 524/511 |

FOREIGN PATENT DOCUMENTS

| | | | |
|---|---|---|---|
| 2023441 | 11/1971 | Fed. Rep. of Germany | 524/511 |
| 718768 | 11/1954 | United Kingdom | 524/511 |

*Primary Examiner*—C. Warren Ivy
*Attorney, Agent, or Firm*—Bierman, Peroff & Muserlian

[57] ABSTRACT

Rubber vulcanisates based on mixtures which contain at least 55% of active fillers and at least 10% of plasticizing oils, having Shore A hardnesses of below 65° in which the active filler contains inorganic active fillers and 10 to 60% of phenolic resin systems consisting of novolaks and hardeners therefor, all these percentages being based on the weight of the rubber, the weight ratio of active inorganic fillers to the phenolic resin systems being from (9:1) to (1:9); the invention further relates to a process for producing such vulcanisates and rubber articles and tires produced from said vulcanisates.

13 Claims, No Drawings

RUBBER VULCANISATES, HAVING A SHORE A HARDNESS OF BELOW 65°

It is known, and part of the prior art, that the addition of suitable amounts of reinforcing fillers to rubber produces vulcanisates having a "high hardness" (meaning, in this specification, a hardness of above 65° Shore A), high strength and a high tensile value. The substances chiefly used as reinforcing fillers are different types of carbon black which have varying effects in terms of enhancing the above-mentioned properties, depending on their structure, particle size and active surface area.

In addition to these increases in hardness and tensile values, it is also possible to obtain further improvements if some of the carbon black is replaced by a phenolic resin reinforcing agent (novolak) and suitable hardeners. Novolaks are suitable as phenolic resins whilst formaldehyde donors such as hexamethylene tetramine and partially or fully etherified melamine and urea resins containing methylol groups are currently in widespread use as hardeners. The use of resin systems of this kind on their own, without any added carbon black, also produces vulcanisates having higher hardness, strength and tensile values than when rubber is used on its own. In practice, the hardness-increasing effect of the resins is used particularly for highly filled mixtures which have to have a high hardness. As is well known, highly filled hard vulcanisates of this kind which are produced with or without the addition of phenolic resin and hardener have a substantially greater development of heat, upon being subjected to repeated mechanical deformation, than soft vulcanisates containing little filler.

For a number of applications, e.g. for tire treads, highly filled mixtures having low hardness are required; fairly large quantities of plasticising oils, for example more than 15%, have to be added to these mixtures. (In this specification, % always indicates percent by weight, based on rubber, unless otherwise stated). Because of the high oil content, vulcanisates with a Shore A hardness of below 65° can be obtained even if 70% or more carbon black is used. If some of the carbon black in these oil-rich mixtures were to be replaced by hardenable phenolic resin systems, one would not expect to obtain vulcanisates having a low hardness and low development of heat, on the basis of experience with rubber mixtures containing little or no oil, as described above, since experience has shown that the carbon black/phenolic resin systems produce even higher hardness and greater heating than carbon black on its own.

Surprisingly, however, it has been found that vulcanisates with low hardnesses, i.e. a Shore A hardness of below 65°, particularly below 62°, will have a low development of heat and at the same time a high elongation at break if, in mixtures containing a large quantity of carbon black filler, i.e. those containing at least 55, preferably at least 60% of active fillers, together with relatively large quantities, i.e. at least 10%, of plasticising oils, some of the carbon black is replaced by a phenolic resin and a hardener therefor. This effect is particularly striking in the case of styrene/butadiene and/or natural rubber and mixtures based on these rubbers containing minor amounts, i.e. less than 50%, of other types of rubber which are used in large quantities in tire production. Since there is a lower development of heat upon mechanical deformation of vulcanisates obtained from rubber mixtures according to this invention than is produced with mixtures according to the prior art, with no reinforcing resins added, a smaller proportion of energy is converted into heat. The invention is based on this surprising fact, which is all the more remarkable as vulcanisates of this kind containing only the same quantity of carbon black as active filler but no phenolic resin systems as reinforcing resins prove less satisfactory in their characteristics.

The invention thus relates to rubber vulcanisates based on mixtures which contain at least 55%, preferably at least 60% and not more than 160%, of active fillers and at least 10% of plasticising oils, having Shore A hardnesses of below 65°, more particularly below 62°, which are characterised in that the active filler contains inorganic active fillers and 10 to 60% of phenolic resin systems consisting of novolaks and hardeners therefor, all these percentages being based on the weight of the rubber, the weight ratio of active inorganic fillers to the phenolic resin systems being from (9:1) to (1:9), preferably from (8:2) to (2:8) and particularly up to (1:2).

The invention further relates to a process for producing vulcanisates having a Shore A hardness of below 65°, more particularly below 62°, in which, upon dynamic deformation, only a reduced proportion of the energy is converted into heat, this process being characterised in that mixtures are vulcanised which contain at least 55%, preferably at least 60% and not more than 160%, of active fillers—including inorganic active fillers—and at least 10% of plasticising oils and wherein a proportion of the active fillers consists of phenolic resin systems consisting of novolaks and hardeners therefor, this proportion being such that the mixture contains at least 10 and not more than 60% of phenolic resin systems; the remarks made above regarding the percentages and the weight ratio also apply here.

The term "active fillers" includes not only inorganic fillers but also phenolic resin systems—i.e. novolaks plus hardeners—with a reinforcing effect. The quantity of active inorganic fillers including carbon black is generally between 30 and 100, preferably between 35 and 80%, whilst the quantity of plasticising oils is between 10 and 60, preferably between 15 and 50%. The quantity of phenolic resin systems is preferably between 15 and 50%. The phenolic resin systems generally contain from 2 to 50, preferably from 5 to 35% of hardener, based on the weight of the novolak.

Suitable types of rubber include, for example, natural rubber, butadiene/styrene rubber, butadiene/acrylonitrile rubber, polybutadiene, polyisoprene, butyl rubber, ethylene/propylene/diene terpolymer rubber or mixtures thereof such as those conventionally used in the tire industry or for the production of industrial rubber goods. Styrene/butadiene and/or natural rubber or mixtures of these types of rubber with minor amounts of other types of rubber are preferred.

Examples of suitable novolak resins include those obtained from phenol and/or polyhydric mono- or polynuclear phenols such as resorcinol, bisphenols, e.g. diphenylol propane and/or diphenylol methane, or mono- or polyhydric phenols substituted by a hydrocarbon group, such as alkyl or aralkyl phenols with, for example, from 1 to 20, preferably 4 to 18 carbon atoms in the substituent, such as tert.butylphenol, octylphenol, nonylphenol, cashew nut shell oil, styrene-modified phenol or phenol modified with fatty acids, such as linoleic acids, or phenylphenol and aldehydes such as acetaldehyde, but preferably formaldehyde, in an acid medium. It is also possible to use phenolic resins modified with inorganic components for reinforcing rubber, e.g. types which have been modified with silicon, aluminium or boron compounds. The novolaks may, in addition, contain plasticising components such as polyethylene glycols, tall oil or other conventional plasticisers. In principle, novolaks consisting exclusively of phenols substituted by hydrocarbon groups and bearing an alkyl group with 1 to 20 carbon atoms may also be used; this applies particularly to those having an alkyl group with, for example, 1 to 4 carbon atoms in the m-position relative to the phenolic hydroxyl group. However, novolaks consisting only of phenols which contain a substituent in the ortho or para position are of limited use since they do not harden as readily. These are therefore preferably used in admixture with trifunctional phenols such as m-cresol, but particularly with phenol. The term "trifunctional phenols" refers to those wherein the ortho and para positions relative to the phenolic hydroxyl group are available for substitution by aldehydes. The phenol component of the novolaks may also contain added amounts of phenols containing more than one alkyl group such phenols being present in an amount of, for example, up to 20 mol-%. For practical use, novolaks consisting of phenol and mixtures of phenol with phenols substituted by a hydrocarbon group, with 4 to 18 carbon atoms in the substituent, including cashew nut shell oil, are preferred. The proportion of substituted phenols in the novolak may vary, provided that the novolak is still hardenable. In general, the proportion of non-trifunctional phenols in the total phenol content is not more than 80, preferably not more than 65 mol-%.

Any compounds which cleave formaldehyde and/or contain free or etherified methylol groups, e.g. amino resins such as urea resins or benzoguanamine resins, may be used as hardeners. The preferred hardeners are, however, hexamethylene tetramine and melamine resins, the latter in the form of at least partially etherified tri-, tetra-, penta- or hexamethylol melamine resins or corresponding more highly condensed polynuclear products, particularly hexamethoxymethylmelamine. The degree of condensation of the aldehyde, particularly formaldehyde resins and their content of free methylol groups may vary within wide limits. The free methylol groups may be etherified with monohydric alcohols with 1 to 12, preferably 1 to 8 carbon atoms, such as methanol, ethanol, the various propanols, butanols, hexanols, octanols, such as ethylhexanol and n-octanol, nonanols and dodecyl alcohol.

The optimum quantities of hardener required to harden the novolak resins must be determined empirically in preliminary tests, which are easily carried out. Generally, about 2 to 50, preferably 5 to 35% by weight of melamine resin or from 2 to 30, preferably 2 to 25% by weight of hexamethylenetetramine are used, based on the novolak.

Suitable plasticising oils are the products conventionally used in the rubber industry, particularly naphthenic and aromatic oils.

The active fillers used may be the standard commercial active carbon blacks and silicic acids. Preferably they consist at least predominantly of carbon black. Suitable inactive fillers include, again, standard commercial carbon blacks and silicic acids and also kaolins, chalk and other conventional fillers. Vulcanisation may be effected without sulphur, using vulcanising resins. However, vulcanisation in the presence of sulphur is preferred. The course of vulcanisation may be adapted to suit the practical requirements by a choice of suitable accelerators, activators and regulators conventionally used in rubber technology. Moreover, anti-oxidants may advantageously also be added to the vulcanisates in order to improve their properties.

The starting mixtures used according to the invention may be produced in conventional manner in internal mixers or on mixing rollers. When the resins are incorporated it may be advantageous for the mixing temperature to exceed the melting point of the resins, particularly the novolak resins, at some stage of the preparation of the mixture so that these resins can be thoroughly distributed. It is also important that the hardeners should be incorporated in such a way as to avoid premature self-condensation or premature reaction with the novolak which is to be cured. This can be achieved by incorporating the hardeners at the end of the mixing operation at moderate temperatures (generally 80° to 120° C.).

Articles obtained from the vulcanisates according to the invention are, for example, technical rubber goods such as shock absorbing elements, rubber sleeves or linings or for tires. The tests described hereinafter serve to illustrate the composition and properties of the rubber mixtures according to the invention. In these tests, a standard commercial styrene/butadiene rubber containing 23.5% of bound styrene was used, further containing an emulsifier based on resinic and fatty acids. A HAF type of carbon black was used as the active carbon black whilst the plasticiser used was a naphthenic oil which was mixed with the rubber beforehand. The product referred to as phenolic resin A in the Tables is a standard commercial phenol novolak with a melting point in the range from 83° to 88° C., measured by the capillary method (DIN 53181), and a viscosity, measured in a 40% solution in ethylene glycol monoethyl ether at 20° C., of from 180 to 250 mPa.s, whilst the phenolic resin B is a conventional phenol novolak modified with aralkylphenol with a melting point in the range from 80° to 90° C. and a viscosity, in 50% solution in ethylene glycol monoethyl ether at 20° C., of from 600 to 1000 mPa.s. Hexamethylenetetramine (Hexa) was used as the hardener. The mixtures were produced using a mixing roller and the accelerator and Hexa were mixed in at the end at temperatures below 120° C. Vulcanisation was effected in 30 minutes at 150° C.

The testpieces obtained were tested for the following properties using the test methods conventionally used in practice:

ultimate tensile strength, elongation at break and tensile values (at 50% and 100% elongation) according to DIN 53504;

Shore A hardness according to DIN 53505;

resilience according to DIN 53512;

permanent set according to DIN 53517;

rise in temperature after 10 minutes under load in a roller bending test apparatus, in which a test cylinder 20 mm in diameter and 100 mm long is dynamically deformed, at a deflection angle at one end of 45°, at a speed of rotation per minute of about 1400;

rise in temperature and permanent deformation in a compression flexometer according to DIN 53533, part 3, corresponding to ASTM D 623, Method A (Goodrich flexometer);

plasticity of the unvulcanised mixtures in a Mooney shearing disc viscometer according to DIN 53524.

EXAMPLES

The tests were carried out using mixtures with the compositions shown in Tables 1 and 2. These tables also show the test results and list the following Examples:

Comparison tests A, B and C, which show the effect of carbon black or phenolic resin alone, in the presence of plasticiser oils.

Tests 1 to 9 with mixtures according to the invention containing carbon black, phenolic resin and plasticiser oil.

Additional comparison tests C to E, which illustrate, with a modified formulation based on natural rubber with no plasticiser oil, the effect of replacing some of the carbon black by phenolic resin.

DISCUSSION OF THE RESULTS

The Table shows that the mixtures 1 to 9 according to the invention produced significantly greater elongation than the comparison mixtures. The strength was of the order of that achieved in the comparison tests A, C, D, E and F and thus significantly better than in comparison test B.

As more and more carbon black is replaced by phenolic resin in tests 1 to 3 and 7 to 9 the tensile values decrease, but in tests 1 to 3 they do not fall to the low level obtained in comparison test B where no carbon black is added. The desired effect of a reduction in hardness is clearly demonstrated, thus showing the advantage of the softness of these test mixtures. This is all the more surprising as, in the additional comparison tests C to E in which no plasticiser oil is used, by contrast, the replacement of carbon black by phenolic resin results in increased hardness.

The high permanent set which is produced by the oil content in the resin-free comparison test A as against C in tests 1 to 3 is not much higher than the value of A and decreases somewhat in this order, whilst the mixtures D and E tend increasingly to be significantly above the value of C, so that in these latter mixtures the phenolic resin has a negative effect. The small rise in temperature in the roll bending test in tests 1 to 6 of only 42° C., at most, in comparison with A and B (38° C.) and in tests 7 to 9 of only 48° C., at most, in comparison with F (55° C.) demonstrates the surprising advantage of the mixtures according to the invention, since, in oil-free systems such as D and E, the addition of resin produces rises in temperature of 106° and 141° C., respectively, as compared with resin-free samples containing carbon black alone (sample C) with 46° C. and one would expect the same to happen in formulations 1 to 9.

Similar results but in a somewhat different order are obtained with the Goodrich flexometer testing; according to this test method, test 3 no longer gives an optimum result.

The permanent deformation in tests 1 and 2 after load in a Goodrich flexometer is somewhat higher than in comparison test A but falls far short of the increase achieved by comparisons D and E over C.

Similar results to those obtained with phenolic resin A in tests 1 to 3 are also obtained with phenolic resin B, whilst the formulation of test 4 with resin B, analogous to test 2, yields a rather smaller elongation, higher tensile values and hardness but a lower permanent set and, advantageously, lower rises in temperature and relatively low permanent deformation. Tests 5 and 6 with a higher resin content and the same or a smaller amount of carbon black illustrate the same trend in the findings with varied formulations.

Apart from the advantages in the properties of the vulcanisates, the unvulcanised mixtures in tests 1 to 6 and 7 to 9 have a substantially lower Mooney plasticity than the comparisons A, C, D and E or F. They therefore require less force during processing and have better flow properties, e.g. in moulds or extruders.

Thus, to sum up, it can be said that the mixtures according to the invention have the advantage of greater elongation, lower hardness, better plasticity and, in certain optimum formulations, a lower development of heat upon dynamic deformation than the mixtures known from the prior art, according to comparisons A to C, whilst being otherwise similar or not significantly less favourable in other respects. Compared with the additional comparisons using resin-containing mixtures D and E according to the present state of the art, the mixtures according to the invention have significantly greater elongation, lower hardness and development of heat and clearly better plasticity.

TABLE 1

Basic mixture (in parts by weight = T): 100 of styrene rubber, 37.5 of plasticiser oil, 3 of ZnO, 1.5 of stearic acid, 2 of anti-oxidants (equal parts of a non-discolouring quinoline derivative and N—isopropyl-N'—phenyl-p-phenylene diamine), 1.8 of sulphur, 2 of N—cyclohexyl-2-benzothiazole sulphenamide

|  | Comparison | | Test | | | | | | Additional comparison* | | |
| --- | --- | --- | --- | --- | --- | --- | --- | --- | --- | --- | --- |
|  | A | B | 1 | 2 | 3 | 4 | 5 | 6 | C | D | E |
| Styrene rubber T | 100 | 100 | 100 | 100 | 100 | 100 | 100 | 100 | 100 | 100 | 100 |
| Plasticiser oil T | 37.5 | 37.5 | 37.5 | 37.5 | 37.5 | 37.5 | 37.5 | 37.5 | — | — | — |
| Carbon black HAF T | 75 | — | 55 | 40 | 30 | 40 | 40 | 30 | 70 | 60 | 50 |
| Phenolic resin A T | — | 67.5 | 18 | 31.5 | 40.5 | — | — | — | — | 9 | 18 |
| Phenolic resin B T | — | — | — | — | — | 31.5 | 36 | 36 | — | — | — |
| Hexa T | — | 7.5 | 2 | 3.5 | 4.5 | 3.5 | 4 | 4 | — | 1 | 2 |
| Mooney plasticity at 120° C. (1 + 4) (Units) | 44 | 10 | 33 | 20 | 17 | 24 | 22 | 20 | 57 | 55 | 42 |
| Strength (MPa) | 18.4 | 2.0 | 19.3 | 15.6 | 12.3 | 16.7 | 15.0 | 11.8 | 12.9 | 14.5 | 12.7 |
| Elongation (%) | 311 | 334 | 410 | 612 | 613 | 531 | 512 | 552 | 187 | 240 | 243 |
| Tensile value 100% (MPa) | 3.3 | 1.8 | 3.5 | 2.5 | 2.2 | 4.0 | 2.9 | 2.7 | 5.4 | 5.8 | 5.2 |
| Shore A hardness (°) | 62 | 72 | 62 | 56 | 52 | 60 | 59 | 55 | 77 | 80 | 89 |
| Resilience (%) | 32 | 47 | 32 | 39 | 44 | 38 | 39 | 43 | 36 | 38 | 38 |
| Permanent set (%) | 44 | 57 | 51 | 49 | 48 | 46 | 47 | 42 | 27 | 48 | 64 |
| Rise in temperature 10' roll bending test (°C.) | 38 | 37 | 39 | 42 | 34 | 35 | 38 | 25 | 46 | 106 | 141 |
| Goodrich flexometer (°C.) | 24 | destroyed | 23 | 22 | 37 | 20 | 29 | 17 | 27 | 44 | 43 |
| Goodrich residual | 7.8 | destroyed | 8.1 | 11.9 | destroyed | 9.3 | 15.9 | 10.1 | 3.5 | 18.6 | 32.9 |

TABLE 1-continued

Basic mixture (in parts by weight = T): 100 of styrene rubber, 37.5 of plasticiser oil, 3 of ZnO, 1.5 of stearic acid, 2 of anti-oxidants (equal parts of a non-discolouring quinoline derivative and N—isopropyl-N'—phenyl-p-phenylene diamine), 1.8 of sulphur, 2 of N—cyclohexyl-2-benzothiazole sulphenamide

|  | Comparison | | Test | | | | | | Additional comparison* | | |
|---|---|---|---|---|---|---|---|---|---|---|---|
|  | A | B | 1 | 2 | 3 | 4 | 5 | 6 | C | D | E |
| deformation (%) | | | | | | | | | | | |

*Additional comparisons, basic mixture (in T): 100 of natural rubber, 5 of ZnO, 1.5 of stearic acid, 2 of anti-oxidant (as above), 2.5 of sulphur, 0.9 of N—cyclohexyl-2-benzothiazolesulphenamide, 0.3 of tetramethylthiurammonosulphide.

TABLE 2

Basic mixture as in additional comparisons C to E

|  | Comparison | Test | | |
|---|---|---|---|---|
|  | F | 7 | 8 | 9 |
| Natural rubber T | 100 | 100 | 100 | 100 |
| Plasticiser oil T | 15 | 15 | 15 | 15 |
| Carbon black HAF T | 70 | 50 | 40 | 30 |
| Phenolic resin B T | — | 18 | 27 | 36 |
| Hexa T | — | 2 | 3 | 4 |
| Mooney plasticity at 120° C. (1–4) (units) | 17 | 14 | 14 | 14 |
| Strength (MPa) | 17.3 | 20.0 | 18.6 | 15.9 |
| Elongation (%) | 226 | 374 | 424 | 414 |
| Tensile value 100% (MPa) | 5.9 | 4.0 | 2.5 | 2.8 |
| Shore A hardness (°) | 69 | 64 | 57 | 46 |
| Resilience (%) | 28 | 36 | 37 | 39 |
| Permanent set (%) | 54 | 64 | 61 | 61 |
| Rise in temperature: 10' roll bending test (°C.) | 55 | 48 | 38 | 24 |
| Goodrich flexometer (°C.) | 32 | 38 | 20 | 16 |

We claim:

1. Rubber vulcanisates having a Shore A hardness below 65° and being based on compositions comprising a rubber component selected from the group consisting of natural rubber, butadiene-styrene rubber, butadiene-acrylonitrile rubber, polybutadiene, polyisoprene, mixtures thereof or mixtures of any of these rubbers with a minor amount of butyl rubber or ethylene-propylene-diene terpolymer rubber, at least 10% of plasticizing oils and at least 55% of active fillers containing active inorganic fillers and from 10 to 60% of phenolic resin systems—acting as reinforcing resins—which consists of novolaks and hardeners therefor, the weight ratio between the active inorganic fillers and the phenolic resin systems being in the range from (9:1) to (1:9), all percentages being referred to the weight of the rubber.

2. A process for the manufacture of vulcanisates of claim 1 having a Shore A hardness below 65° in which, upon dynamic deformation, only a reduced portion of the energy is converted into heat which comprises subjecting to curing a composition containing at least 10% of plasticizing oils and at least 55% of active fillers which in part consist—in addition to inorganic active fillers—of phenolic resin systems acting as reinforcing resins and contain such systems in an amount such that their content is at least 10 and at most 60%, the phenolic resin systems consisting of novolaks and hardeners therefor, the weight ratio between the active inorganic fillers and the phenolic resin systems being in the range from (9:1) to (1:9) and all percentages being referred to the weight of the rubber.

3. A vulcanisate as claimed in claim 1, wherein the Shore A hardness of the vulcanisates is below 62°.

4. A vulcanisate as claimed in claim 1, wherein the amount of the active fillers is in the range from 60 to 160% and the weight ratio of the active inorganic fillers to the phenolic resin systems is from (8:2) to (2:8).

5. A vulcanisate as claimed in claim 1, wherein the amount of the active inorganic fillers is in the range between 30 and 100%, that of the phenolic resin systems is between 15 and 50%, that of the plasticizing oils is between 10 and 60% and that of the hardener is between 2 and 50%, the amount of the hardener being referred to the weight of the novolak.

6. A vulcanisate as claimed in claim 1, wherein as a hardener 2 to 50% of a melamine resin or 2 to 30% of hexamethylene tetramine is used, referred to the weight of the novolak.

7. A vulcanisate as claimed in claim 1, wherein the active inorganic filler consists at least predominantly of carbon black.

8. A vulcanisate as claimed in claim 1, wherein the rubber is styrene-butadiene-rubber or natural rubber or a mixture thereof or a mixture of any of these rubbers with an inferior amount of other rubber types.

9. A vulcanisate as claimed in claim 1, wherein the novolak used is derived from phenol or a mixture thereof with such phenols which are substituted by a hydrocarbon group, and formaldehyde.

10. A vulcanisate as claimed in claim 4, wherein the weight ratio of the active inorganic fillers to the phenolic resin systems is from (8:2) to (1:2).

11. A vulcanisate as claimed in claim 5, wherein the amount of the active inorganic fillers is in the range between 35 and 80%, that of the plasticizing oils is between 15 and 50% and that of the hardener is between 5 and 35%, the amount of the hardener being referred to the weight of the novolak.

12. A vulcanisate as claimed in claim 6, wherein as a hardener 5 to 35% of a melamine resin or 2 to 25% of hexamethylene tetramine is used, referred to the weight of the novolak.

13. Rubber articles and tires produced from or with the use of rubber vulcanisates as claimed in claim 1.

* * * * *